United States Patent [19]

Havens

[11] Patent Number: 4,899,521

[45] Date of Patent: Feb. 13, 1990

[54] ANTISTATIC THERMOPLASTIC/POLYAMIDE-POLYETHER COMPOSITIONS AND ANTISTATIC POLYMERIC FILMS MADE THEREFROM

[75] Inventor: Marvin R. Havens, Greer, S.C.

[73] Assignee: W. R. Grace & Co. - Conn., Duncan, S.C.

[21] Appl. No.: 101,909

[22] Filed: Sep. 28, 1987

Related U.S. Application Data

[63] Continuation-in-part of Ser. No. 918,451, Oct. 14, 1986.

[51] Int. Cl.$^4$ .................... C08K 5/43; C08L 77/10
[52] U.S. Cl. ........................ 53/461; 206/328; 206/331; 428/178; 428/423.3; 428/424.8; 524/159; 524/317; 524/376; 524/377; 524/606; 524/910
[58] Field of Search .............. 524/159, 910, 606; 53/461; 428/178, 424.8, 423.3

[56] References Cited

U.S. PATENT DOCUMENTS

| | | |
|---|---|---|
| 2,214,405 | 9/1940 | Coffman ........................ 524/169 |
| 3,022,543 | 2/1962 | Baird . |
| 3,164,481 | 1/1965 | Shibe . |
| 3,220,985 | 11/1965 | Breslow . |
| 3,223,545 | 12/1965 | Gallaugher et al. . |
| 3,405,020 | 10/1968 | Chavennes . |
| 3,416,984 | 12/1968 | Chavennes . |
| 3,441,552 | 4/1969 | Rombusch et al. . |
| 3,555,604 | 1/1971 | Pahlke . |
| 3,576,649 | 4/1971 | Brazier . |
| 3,586,565 | 6/1971 | Fielding . |
| 3,741,253 | 6/1973 | Brax . |
| 3,785,899 | 1/1974 | Fielding . |
| 3,821,182 | 6/1974 | Baird . |
| 4,048,428 | 9/1977 | Baird . |
| 4,117,193 | 9/1978 | Tsuchiya et al. . |
| 4,178,401 | 12/1979 | Weinberg . |
| 4,188,443 | 2/1980 | Mueller . |
| 4,194,039 | 3/1980 | Mueller . |
| 4,229,241 | 10/1980 | Mueller . |
| 4,268,583 | 5/1981 | Hendy . |
| 4,274,900 | 6/1981 | Mueller . |
| 4,331,786 | 5/1982 | Foy et al. . |
| 4,332,920 | 6/1982 | Foy et al. . |
| 4,347,332 | 8/1982 | Odorzynski et al. . |
| 4,361,680 | 11/1982 | Borg et al. . |
| 4,494,651 | 1/1985 | Malcolm . |
| 4,536,532 | 8/1985 | Miller . |
| 4,554,210 | 11/1985 | Long et al. . |
| 4,576,669 | 3/1986 | Caputo . |
| 4,579,516 | 4/1986 | Caputo . |
| 4,600,743 | 7/1986 | Shizuki et al. . |
| 4,605,684 | 8/1986 | Pcolinsky . |
| 4,623,594 | 11/1986 | Keough . |

OTHER PUBLICATIONS

ICI Americas' brochure entitled "Atmer ® 129 Internal Antistatic Agent for Thermoplastic Polymers".
An advertising brochure from Atochem entitled "Pebax ® Technical Notice", Jun. 1986, No. 507E-9E.
Brochure from Emser Werke AG entitled "Nylon 12 Grilamid ® The High Performance Polyamide".
Federal Test Method 101C, Method 4046.1, "Electrostatic Properties of Materials".
Akzo Chemie Brochure on Ketjenflex 8, no publication date available.
Monsanto Brochure on Santicizer 8, no publication date available.
Akzo Chemie Brochure on Ketjenflex 9, no publication date available.
Monsanto Brochure on Santicizer 9, no publication date available.
Unitex Brochure on Uniplex 214; 9/87.

*Primary Examiner*—C. Warren Ivy
*Attorney, Agent, or Firm*—John J. Toney; William D. Lee; Jennifer L. Skord

[57] ABSTRACT

Disclosed is a film having antistatic characteristics and a method to make the film. The film comprises a blend of polyether block amide copolymer with an aromatic sulfonamide antistatic agent.

28 Claims, No Drawings

ANTISTATIC THERMOPLASTIC/POLYAMIDE-POLYETHER COMPOSITIONS AND ANTISTATIC POLYMERIC FILMS MADE THEREFROM

This patent application is a continuation-in-part of copending U.S. Ser. No. 918451 filed Oct. 14, 1986 to Havens and Lovin, the disclosure of which is incorporated herein by reference.

This invention relates to thermoplastic polymeric compositions having antistatic characteristics. Such antistatic polymeric compositions are useful, for instance, in making films for packaging for electronic devices that are sensitive to static electricity. More particularly, this invention relates to such films wherein at least one layer thereof comprises a copolymer chosen from the polyether block amides, also known as polyamide-polyether copolymers, of the general formula

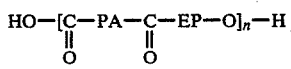

wherein PA represents the polyamide segment and EP the polyether segment, and n is the number of repeating units in the polymer chain. These polyamide-polyether copolymers are abbreviated herein as PAEPC. The terms "polyether block amide copolymer", "polyamide-polyether copolymer", and "PAEPC" are used interchangeably herein.

BACKGROUND OF THE INVENTION

When two surfaces are brought in contact with each other, a transfer of electrons may occur resulting in a residual static electrical charge when the surfaces are separated. This phenomena is known as triboelectricity. If the surface is composed of a material that is a conductor, the electrons will dissipate quickly thereby eliminating the excess charge. On the other hand, if the surface is composed of a material that is an insulator (a dielectric), the surface charge takes much longer to dissipate. Thermoplastic polymers are typically excellent insulators and thus are unsatisfactory for uses requiring a nature that will dissipate charges. As the polymers accumulate high charges promoting an attraction for dust and dirt, they can discharge to any lower potential body with which they come in contact. To modify a polymer to have antistatic characteristics and dissipate charges, the conductivity might be increased which in turn causes an increase in the rate of static dissipation. This has been accomplished in the past by the use of antistatic agents to promote static-charge decay of surfaces thereby reducing clinging effect, eliminating spark discharge, and preventing accumlation of dust.

It is well known that static charge can be reduced by increasing the moisture content of the atmosphere, and thus the approach in the past has been to use an antistatic agent which will chemically modify the polymer to impart hydrophillic properties to it by providing functional groups that attract moisture to it. For instance, it is well known to apply external antistatic agents onto polymers by conventional coating or painting methods. Also, it is well known to employ internal antistatic agents which are volume dispersed in the polymer; i.e. incorporated into the polymer by compounding or extrusion prior to or during molding or film-forming operations, and work by migrating to the polymer surface. This migration is colloquially referred to in the art of antistatic polymer chemistry as a "blooming" effect. When the antistatic agent has not remained volume dispersed but instead has bloomed to the surface, the mechanism for moisture attraction is the same as with the painted on external antistatic agents. The atmospheric moisture is attracted causing decay or dissipation of static charges, i.e. such films depend on ambient humidity. Accordingly a high rate of blooming is required. Such films can overbloom and lose their antistatic character is subjected to a 24 hour water shower or a prolonged hot, humid atmosphere.

An example of an external antistatic agent is described in U.S. Pat. No. 3,223,545 to Gallaugher et al which discloses a dialkanol amide of the formula R—C(O)—N[(CH$_2$)$_n$OH]$_2$ wherein R is a C$_6$-C$_{16}$ alkyl and n is an integer from 2-4, dispersed in a volatile liquid which is applied to the surface of a solid polymer.

Another external antistatic agent applied directly to the surface of a polymeric substrate is described in U.S. Pat. No. 4,268,583 (1981) to Hendy which relates to a film having a polypropylene (PP) substrate and a polymeric heat-sealable surface layer on which is present an antistatic composition comprising (a) a quaternary ammonium compound, such as choline chloride, (b) an organic polyol containing at least two free hydroxyl groups, such as glycerol, (c) a glyceride of a long chain fatty acid, such as glyceryl monostearate, and, optionally, (d) an ethoxylated amine salt, such as an ethoxylated tallow amine sulphate.

Another external antistatic agent is described in U.S. Pat. No. 4,623,594 (1986) to Keough which relates to an antistatic laminate having: (A) a substrate sheet; and (B) a continuous coating on one side of said substrate sheet, said continuous coating being the electron radiation cured product of: (1) an electron beam curable prepolymer; and (2) an effective amount of saturated quaternary ammonium compound antistatic agent soluble in said prepolymer, the product being a reaction product of the prepolymer and the ammonium compound converted into a substantially solid product.

An internal antistatic agent is described in U.S. Pat. No. 3,220,985 to Breslow which discloses modifying hydrocarbon polymers with mono-sulfonazide of the formula RSO$_2$N$_3$, where R is an organic radical inert to the modification reaction, i.e. modifying PP with p-toluene sulfonazide.

Another internal antistatic agent is described in U.S. Pat. No. 3,164,481 to Shibe which discloses combining a quaternary ammonium benzosulfimide with a plastic. Benzofulfimide is also known as saccharin.

Also of interest is the internal antistatic agent described in U.S. Pat. No. 3,576,649 to Brazier. This patent relates to a package for electrically non-conductive pulverulent material. The package has an inner layer of heat sealable ethylene polymer and a fatty acid amide.

Also of interest is the internal antistatic agent described in U.S. Pat. No. 3,441,552 to Rombusch et al. The patent discloses incorporating an alkoxypropylamine of the formula R$_1$—O—(CH$_2$)$_3$—N(R$_2$)(R$_3$) into a polyolefin where R$_1$ is an alkyl, alkenyl, alkylcycloalkyl, aryl, alkylaryl or alkenylaryl group of 6-25, preferably 8-18 C atoms in the alkyl or alkenyl moieties and 4-18, preferably 6-12 C atoms in the cycloalkyl moiety, and 6-14, preferably 6-10 C atoms in the aryl moiety; R$_2$ and R$_3$ can each represent a H atom, or an alkyl or alkenyl group of 1-5 C atoms, i.e., 100 g octadecyloxypropyl-N,N-dimethylamine blended with 10 kg PP.

Another internal antistatic agent is disclosed in U.S. Pat. No. 4,554,210 (1985) to Long et al, which claims a first and second outer layer of polyethylene having a surface resistivity at least $1\times10^{16}$ ohms per square; and a middle layer sandwiched therebetween of polyethylene impregnated with a sloughable, electrically-conductive material providing said middle layer with a volume resistivity no more than $1\times10^3$ ohms/cm.

ICI Americas' brochure entitled "Atmer® 129 Internal Antistatic Agent for Thermoplastic Polymers" advertises using their new glycerol monostearate in PP, low density polyethylene and polyvinylchloride.

Another internal antistatic agent is disclosed in U.S. Pat. No. 4,600,743 (1986) to Shizuki et al which describes an antistatic fiber obtained by melt spinning of a fiber-forming thermoplastic polymer containing at least one of polyoxyalkylene glycol and its derivatives in an amount of not less than 0.5% by weight.

Another internal antistatic agent is disclosed in U.S. Pat. No. 4,117,193 (1978) to Tsuchiya et al, which discloses a film prepared by melt extrusion laminating a polymer blend composition of a low-crystalline resin of an ethylene-butene copolymer and a polyolefin resin having incorporated therein a lubricant and an antiblocking agent onto surface(s) of a uniaxially stretched PP film followed by stretching the laminate in the direction perpendicular to the direction in which said PP has been stretched and optionally subjecting the resultant to corona discharge.

Also of interest is U.S. Pat. No. 4,605,684 (1986) to Pcolinsky which relates to an internal antistatic agent. It discloses a method of preparing polyurethane foam from a polyol and a polyisocyanate the improvement being adding to the foam-forming composition from about 5 to about 25 parts by weight per 100 parts by weight of polyol of an antistatic composition of one part by weight of a quaternary ammonium compound selected from the group consisting of soya dimethyl ethyl ammonium ethylsulfate, soya dimethyl ethyl ammonium ethylphosphate, and mixtures thereof and from about 0.4 to about 3 parts by weight of plasticizer composition selected from the group consisting of N-ethyl-o- and p-toluene sulfonamide, o- and p-toluene sulfonamide, tetrakis (2 chloroethyl) ethylene diphosphate, and mixtures thereof, to provide a foam having a reduced tendency to develop and accumulate electrostatic charges.

The following patents, which do not relate to antistatic compositions, are also of general interest. For instance, U.S. Pat. No. 4,536,532 (1985) to Miller, relates to a process for the manufacture of a polyvinyl alcohol homopolymer having a vinyl alcohol content in excess of 95% wherein said homopolymer is mixed with a plasticizer selected from the group consisting of N-substituted fatty acid amides; aryl, alkaryl, N-aryl aryl, N-alkaryl aryl and N-alkyl alkaryl sulfonamides and alkaryl sulfonamides; N-alkyl pyrrolidones; sulfonated alkyl phenols; aryl and alkaryl phosphates and phosphites; alkylene carbonates and selected mixtures thereof. Also, a blend of high melting nylon (melting point 415°–440° F.) and ethylene vinyl alcohol copolymer (EVOH) plasticized with lauramide, o,p-toluenesulfonamide, N-ethyl-o,p-toluene-sulfonamide or a polyamide of 7000-10,000 molecular weight, is described in U.S. Pat. No. 4,347,332 to Odorzynski et al.

Polyether block amide copolymers, i.e. polyamide-polyether copolymers (PAEPC), are described in U.S. Pat. No. 4,361,680 (1982) to Borg et al, U.S. Pat. No. 4,332,920 (1982) to Foy et al, and U.S. Pat. No. 4,331,786 (1982) to Foy et al, (all assigned to ATO Chimie), the disclosures of which are incorporated herein by reference. Also an advertising brochure from Atochem, entitled "Pebax® Technical Notice", June 1986, No. 507E-9E, the disclosure of which is incorporated herein by reference, describes properties of various PAEPC's marketed under the trade-name Pebax®, and in particular at pages 13–15 describes the electrical properties of the various Pebax copolymers. The brochure states that Pebax 4011 by itself is antistatic in nature because it is extremely hydrophillic, as it will absorb 120% of its weight in water when allowed to soak for 24 hours. This material is so hydrophillic that it would be inappropriate for packaging electronic devices as so much moisture from the atmosphere would be attracted that as the water released it would corrode the packaged device. Thus, it is herein defined that by the terms "polyether block amide copolymer", "polyamide-polyether copolymer", and "PAEPC", which are used interchangeably, it is not intended to include the extremely hydrophillic Pebax® 4011 or any other polyether block amide copolymer that is as hydrophillic as, or substantially as hydrophillic as, Pebax® 4011. It is intended to include polyether block amide copolymer having a degree of hydrophilicity suitable for packaging electronic devices. While it is not intended to be bound to any theory, it is believed that the extremely hydrophillic characteristic of Pebax 4011 is due to the EP component of the Pebax 4011 copolymer forming a helix with the oxygens inside, which tends to hold moisture inside the helix. Pebax 4011 is about 50% by weight EP and 50% by weight PA. The brochure also states the natural Pebax grades of the Pebax--33 series have a surface resistivity of $10^{10}$ ohms·cm. The brochure also describes making the Pebax grades of the Pebax--33 series of copolymers semi-conductive by adding carbon black thereto. It is noted here that the addition of carbon black to polymers to make them semi-conductive is old technology and well known to those skilled in the art of antistatic and conductive polymeric chemistry.

SUMMARY OF THE INVENTION

The present polyether block amide copolymer containing the aromatic sulfonamide agent may be made into a single ply and/or multiple ply film, and additional advantageous features, further described below, may be obtained when such films are irradiated. The films of the invention will dissipate an applied charge of ±5000 volts direct current in about 3000 ms or less, more preferably about 2000 ms or less. A film made simply of polyether block amide copolymer alone, without the aromatic sulfonamide, will not dissipate the applied 5000 VDC in about 3000 ms or less, as is illustrated in Table C below. The composition of polymer and agent may be extruded together with polymers known for their strength such as ethylene vinyl acetate (EVA) or linear low density polyethylene (LLDPE). The resultant film is useful for making packaging, such as a bag or over-wrap, for electronic devices that are sensitive to static electricity. Such a film may also be fashioned to have cushioning characteristics by using bubble cap (also known as air cushioning) machinery such as that described in U.S. Pat. Nos. 4,576,669 and 4,579,516 both to Caputo, or that described in U.S. Pat. Nos. 3,416,984, 3,405,020, 3,586,565, and 3,785,899, all assigned to Sealed Air, the disclosures of which are incorporated herein by reference, to make a bubble cap package which provides cushioning and then bagging or wrapping an electronic device therewith. Such a cushioning bubble cap material (also known as cellular material or air cushioning material) is also useful in lining a portable work station used for storage and transportation of static electricity sensitive devices such as the work stations disclosed in U.S. Pat. No. 4,494,651 issued in 1985 to Malcolm. Also such a film, which may or may not be in a cushion form, is useful to make a package for devices in a medical operating room where explosive oxygen and/or ether are present and thus protection from static electricity must be provided.

Therefore, it is an object of the present invention to provide an antistatic polymeric composition adapted for use in making a film useful for wrapping static sensitive devices. It is also an object to provide such films having an increased tendency to dissipate electrostatic charges. It is also an object that in a preferred embodiment the films are substantially independent of ambient humidity, i.e. the films are still able to decay an applied ±5000 VDC in less than about 2000 ms even after a 24-hour water shower or several days in a hot humid oven.

A feature of the films is that they also have excellent see-through properties which is advantageous for reading code numbers preprinted on a product wrapped with the film.

The present invention provides as a composition of matter adapted for use to produce a thermoplastic polymeric film having antistatic characteristics, a polyether block amide copolymer blend comprising a polyether block amide copolymer in admixture with an antistatic agent.

The invention also provides an antistatic film comprising at least one layer of a polyether block amide copolymer in admixture with an antistatic agent.

The invention also provides a method for the manufacture of a film having antistatic characteristics comprising admixing a polyether block amide copolymer with an antistatic agent and forming a film having at least one layer of the admixture of polyether block amide copolymer with antistatic agent.

The invention also provides a film having antistatic characteristics comprising at least the multilayer structure: polyether block amide copolymer+aromatic sulfonamide/polyolefin.

The invention also provides a method for protecting packaged static sensitive devices from electrostatic charges comprising (a) providing a package comprising an antistatic film having at least one layer comprising a blend of a polyether block amide copolymer in admixture with an antistatic agent; and (b) conforming said package about a selected device.

The invention also provides an antistatic film comprising a core layer of a major amount of a polyether block amide copolymer having nylon 12 as its polyamide component and polytetramethylene oxide as its polyether component, and a minor amount of aromatic sulfonamide, and at least one outer layer of a major amount of a polyolefin and a minor amount of a fatty acid ester of a polyhydroxy alcohol, a polyalkoxylated compound or a mixture thereof, which film will exhibit a decay time of about 2000 ms or less.

DETAILED DESCRIPTION OF THE INVENTION

There is no particular method required for incorporating the antistatic agent into the polymer, and any of the well-known solvent "wet" blending, melt, blending, or dry blending methods, such as those discussed in the "BACKGROUND OF INVENTION" section above, may be employed.

Measuring the antistatic property:

The antistatic property is exhibited by the ability of the polymer containing the agent to promote static charge decay, i.e. to dissipate a static charge. The polymer alone will not dissipate a static charge, but the polymer containing the agent is able to dissipate 99% of an applied static charge of ±5000 volts direct current (VDC) in a short amount of time, i.e. less than 3 seconds, more preferably less than 2 seconds (2000 milliseconds). Federal Test Method Standard 101C, Method 4046.1, "Electrostatic Properties of Materials" states less than 200 ms and thus it is preferred to have a material that complies with 101C. Decay meters for measuring the time for dissipation of the applied volts are commercially available, such as the 406C static decay meter supplied by Electrotech Systems, Inc.

Sometimes, as further described in the examples below, the dissipation of 5000 volts in the range of the highly preferred 2000 ms or less was observed in certain mulit-layer film embodiments only if the film had been irradiated.

Some of the films were tested for resistivity. The Department of Defense (DOD) and the Electronics Industry Association (EIA) each have their own standards on surface resistivity of a material as follows:

| SURFACE RESISTIVITY RANGES IN OHMS/SQUARE | | | |
|---|---|---|---|
| Insulative | Antistatic | Static Dissipative | Conductive |
| DOD greater than $10^{14}$ | $10^{14}$ to $10^9$ | $10^9$ to $10^5$ | less than $10^5$ |
| EIA greater than $10^{13}$ | $10^{13}$ to $10^5$ | | less than $10^5$ |

As can be seen, there are two main differences. One is that EIA defines insulative as above about $10^{13}$ ohms/square, whereas DOD defines insulative as above $10^{14}$ ohms/square. The other difference is that EIA has one range of about $10^{13}$ to about $10^5$ ohms/square as antistatic, which results in antistatic being synonymous with static dissipative. On the other hand, DOD divides this range into two separate ranges of about $10^{14}$ to about $10^9$ ohms/square for antistatic and about $10^9$ to about $10^5$ ohms/square for static dissipative. Frequently the literature, especially older literature, equates antistatic with static dissipative in discussions about static electricity.

There is not necessarily a correlation between the surface resistivity of a film and the ability of a film to dissipate charges. Thus, the term "antistatic" as used herein describes a material which can dissipate 99% of an applied static charge of ±5000 VDC in a short amount of time, preferably less than about 3 seconds, more preferably less than about 2 seconds (Federal Test Method Standard 101C, Method 4046.1, "Electrostatic Properties of Materials". Film consisting of polyether block amide copolymer alone without the aromatic sulfonamide agent cannot decay the ±5000 VDC in less than about 3000 ms, let alone within the more preferred less than about 2000 ms.

Suitable antistatic agents and suitable polymers:

Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible structures of the material. These structures include, but are not limited to, isostatic, syndiotactic and random symmetries.

The term "polyolefin" as used herein generally includes, but is not limited to, materials such as polyethylene, polypropylene, ethylene-vinyl acetate and the like, the homopolymers, copolymers, terpolymers etc. thereof, and blends and modifications thereof. The term "polyolefin" shall include all possible structures thereof, which includes, but is not limited to, isotactic, syndiotactic and random symmetries.

Suitable antistatic agents may be selected from the aromatic sulfonamides. The aromatic sulfonamides may be ortho, meta, or para substituted on the aromatic part thereof, or may be N-substituted on the amide group thereof. It is noted that para-amino substituted benzene sulfonamides are called sulfanilamides, and such compounds have been previously known as the "sulfa" drugs. Representative examples of aromatic sulfonamides include, but are not limited to, benzenesulfonamide, N-butyl benzenesulfonamide, o-toulene-sulfonamide, p-toluenesulfonamide, N-ethyl-o-toluenesulfonamide, N-ethyl-p-toluenesulfonamide, or mixtures thereof.

As disclosed in the parent copending U.S. Ser. No. 918451, in particular with aromatic sulfonamide antistatic agents, polyamides may be advantageously employed as the polymer. By polyamide, i.e. "nylon" polymer, it is intended in include copolymers and terpolymers thereof. Various suitable nylon polymers are nylons which can be produced as polymers of the reaction products of (i.e. polycondensation products and/or polyaddition products of) various combinations of diacids and diamines or lactams as well as copolymers, terpolymers, et cetera, combinations of lactams, diacids and diamines with lactams, multiple diacids and dibases with lactams, et cetera. It is intended to include, but not limit to, the several such nylons given below. Polymers of the reaction products of diacids and dibases include the polymer of the reaction product of adipic acid and hexamethylene diamine (commonly known as nylon 6/6), the polymer of the reaction product of sebacic acid and hexamethylene diamine (commonly known as nylon 6/10), and polymers of the reaction product of hexamethylenediamine and a 12-carbon dibasic acid (commonly known as nylon 6/12). Polymers of the reaction product of lactams include, but are not limited to caprolactum (commonly known as nylon 6), the polycondensation product of the monomer 11-aminoundecanoic acid (commonly known as nylon 11) and the addition product of lauryllactam or cyclodecalactam (both of which are commonly known as nylon 12). These and similar lactam copolymers are available with a wide variety of caprolactam and lauryllactam relative amounts. Other commercially available nylons include copolymers made from caprolactam with adipic acid and hexamethylene diamine (commonly known as nylon 666) and terpolymers made from caprolactam and lauryl lactam with adipic acid and hexamethylene diamine (commonly known as nylon 66612). It is further possible to blend physically and extrude various nylons to achieve a wide range of physical properties. A very suitable nylon polymer is nylon 11, nylon 12, a copolymer of nylon 11, a terpolymer of nylon 11, a copolymer of nylon 12, a terpolymer of nylon 12, or mixtures thereof. Commercially available nylon 11 or nylon 12 include, but are not limited to, Nuodex TM nylon 12 from Huls, Rislan TM nylon 11 from Atochem, and Grilamid nylon 12 from Emser. In an especially preferred embodiment, the nylon 11 or 12 contains a minor amount, preferably about 5% to 25% by weight, of a nylon 6/12. In the present invention of this continuation-in-part, polymers that are the polyamide-polyether copolymers, i.e. the polyether block amide copolymers are especially suitable for use with aromatic sulfonamide antistatic agents. As these materials are copolymers of a polyamide and a polyether, they may be considered to be a type of polyamide. Suitable commercially available polyether block amide copolymers (PA-EPC) are marketed under the trade-name Pebax®. Preferred PAEP copolymers are those wherein the EP component is polytetramethylene oxide and the PA component is nylon 12. These are commercially available as the Pebax--33 series (such as Pebax 2533, Pebax 3533, Pebax 4033, Pebax 5533, and Pebax 6333). The EP component is about 80% by weight and the PA component about 20% by weight for Pebax 2533. As the Pebax resin number increases for the --33 series, the EP component decreases and the PA component increases till the components are about 20% by weight EP and 80% by weight polyamide for Pebax 6333.

The antistaic polymeric composition, which may be coextruded into a film, is obtained from aromatic sulfonamide, preferably in an amount of about 5% to about 80%, more preferably about 10% to about 70% by weight, of the total, which has been mixed with a polyether block amide copolymer. In an especially preferred embodiment of the present invention, the aromatic sulfonamide is mixed with polyether block amide copolymer that has nylon 12 as its PA component and polytetramethylene oxide as its EP component, and the resultant extruded into a mulit-layer film having a core layer of polyether block amide copolymer containing aromatic sulfonamide, outer layers of a polyolefin containing agent (a) or agent (b) or a mixture thereof, and wherein the film has been irradiated. Agents (a) and (b) are further defined in the paragraph below. Certain of these multilayer films having a layer of polyether block amide copolymer and aromatic sulfonamide will still perform excellently as an antistatic film (i.e. dissipate 5000 volts in less than the highly preferred 2000 ms) even after abuse such as a hot oven (160° F.) and some even after such extreme abuse as a 24-hour water shower.

Suitable antistatic agents for the polyolefin skin layers of the preferred embodiment described in the paragraph above may be selected from (a) fatty acid esters of polyhydroxy alcohols, (b) polyalkoxylated compounds (i.e. polyethers) such as polyethylene oxides, polypropylene oxides, polybutylene oxides, polytetramethylene oxides, the reaction products of polyalkoxylates with fatty acids, the reaction products of polyalkoxylates with fatty alcohols, the reaction products of polyalkoxylates with fatty acid esters of polyhydroxyl alcohols (for instance polyalkoxylate reaction products of fatty acids, of fatty glycols, of fatty sorbitols, of fatty sorbitans, and of fatty alcohols), or a mixture thereof, or a mixture of (a) and (b). Suitable fatty group chains in either (a) or (b) are desirably from about $C_8$ to about $C_{50}$, or even higher. Natural fatty groups are in the lower range and synthetic ones are in the higher range. For instance, Unithox TM, a reaction product of polyalkoxylate with fatty alcohol, is an ethoxylated synthetic fatty alcohol supplied by Petrolite Corporation, which may have up to about 50 carbons in the fatty group chain. The polyether chains in the suitable polyalkoxylated compounds are of the formula $(-OC_xH_{2x}-)_n$ wherein x is from 2 to about 8, wherein the alkyl group is straight or branched, and wherein n is from 2 to about 1000. Each agent will work by itself in a polymeric composition, as such antistatic compositions exhibit excellent static decay times; however, the combination of agents (a) and (b) in a polymeric composition is more desirable as these antistatic compositions display even shorter static decay times. Desirable fatty acid ester substituted polyhydroxy alcohols include, but are not limited to, the polyhydroxy alcohols selected from the $C_2$ to $C_6$ alcohols, such as ethylene glycol, 1,3-propylene glycol, 1,2-propylene glycol, 1,2-butanediol, meso 2,3-butanediol, 1,4-butanediol, pinacol, pentaerythritol, 1,2,3,4,5-pentanepentol, sorbitan, or sorbitol, which polyhydroxy alcohol has been substituted with one or more fatty acid ester groups. A very desirable polyether is polyethylene oxide, such as that sold by Union Carbide under the trade name Polyox, or is polytetramethylene oxide, such as that sold by du Pont under the trade name Terathane. A very desirable polyalkoxylate of a fatty alcohol is a polyethoxylated cetyl alcohol (PECA), as represented by the formula $C_{16}H_{33}-O(-C_2H_4-O-)_nH$ wherein n is from 2 to about 50. Antistatic agents chosen from (a), (b) or a mixture thereof are especially suitable for use with thermoplastic polymers chosen from the polyolefins, more particularly the polyethylenes. Polyethylenes are further described in the "Definitions" below. Advantageously, the polyolefin contains less than about 20% by weight, more preferably less than about 15% by weight of the antistatic agent chosen from (a), (b) or a mixture thereof. Also, it is advantagous if the composition of polyolefin and antistatic agent includes a small amount of about 10% by weight or less, more desirably about 7% by weight or less of an antiblock, to help alleviate any tackiness. A suitable antiblock is EPE 8160 supplied by Teknor Apex.

Manufacture of Films:

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar, as opposed to tubular, form are also well known. If heat shrinkable film is desired, then after extrusion, the film is typically cooled and then reheated and stretched, i.e. oriented by "tenter framing" or by inflating with a "trapped bubble", to impart the heat-shrinkable property to the film, as is further described below. High energy irradiation, typically via an electron beam, preferably takes place prior to the stretching for orienting the film. However, for some embodiments of the present invention, such irradiation is not necessary since a very suitable packaging film is obtained without irradiation. Below, first is described the general process for making and orienting film. Then irradiation is described.

More particularly, manufacturing of films may be accomplished as follows. For instance, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orientation may be conducted at some point during the cool down and while the film is still hot and within its orientation temperature range followed by completing the cooling. Alternatively, after the post extrusion cooling, the relatively thick "tape" extrudate is then reheated to a temperature within its orientation temperature range and stretched to orient or align the crystallites and/or molecules of the material and then cooled. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented. The terms "orientation" or "oriented" are used herein to describe generally the process steps and resultant product characteristics obtained by stretching and immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction monoaxial orientation results. When the stretching force is simultaneously applied in two directions biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film) and initially cooled, is then reheated to within its orientation temperature range and oriented by stretching. The stretching to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

Of course, if a film having little or no orientation is desired, e.g. non-oriented or non-heat shrinkable film, the film may be formed from a non-orientable material or, if formed from an orientable material may be formed from a tube by using a "trapped bubble" technique commonly known as the "hot blown" technique. In forming a hot blown film, the tube is not cooled initially after extrusion or coextrusion but rather is first stretched by a hot blown bubble essentially immediately after extrusion while the tube is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or case coextrusion which, likewise, is well known to those in the art.

Whichever film has been made (the non-oriented molecular configuration or the stretch-oriented "heat-shrinkable" molecular configuration), it may then be stored in rolls and utilized to package a wide variety of items. If the material was manufactured by "trapped bubble" techniques the material may still be in tubular form or it may have been slit and opened up to form a sheet of film material. In this regard, the product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

If the material is of the heat-shrinkable, i.e. "oriented", type, then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bag or pouch forming methods, likewise, are well known to those of skill in the art.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is simultaneously or sequentially coated onto the outer surface of the first tubular layer or a successive layer.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,555,604; 3,741,253; 3,821,182 and 3,022,543. The disclosures of these patents are generally representative of such processes and are hereby in-corporated by reference.

Many other process variations for forming films are well known to those in the art. For, example, conventional pressing, thermoforming or laminating techniques (including corona laminating) may be employed. For instance, multiple layers may be first coextruded with additional layers thereafter being laminated thereon, or two multi-layer tubes may be coextruded with one of the tubes thereafter being laminated onto the other.

If the heat shrinkable, i.e. "oriented", film is desired, after extrusion and cooling, then after irradiation (or without irradiation), the tube may then be heated to soften it, and then the softened tube is passed through pinch rolls and stretch oriented by the trapped blown bubble technique discussed above.

Irradiation may be accomplished by the use of high energy electrons, ultra violet radiation, X-rays, gamma rays, beta particles etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

It is also generally well known in the art that irradiation, such as by electron beam irradiation, of certain polymeric film materials generally results in a material having improved heat shrink properties, abuse resistance, structural integrity, tensile strength, puncture resistance, and/or delamination resistance. Such physical improvements from irradiation, are discussed in U.S. Pat. No. 3,022,543 (1962) to Baird et al, U.S. Pat. No. 4,178,401 (1979) to Weinberg and U.S. Pat. No. 3,741,253 to Brax et al.

Suitable films have the structure: polymer + antistatic agent, or the structure: polymer + antistatic agent/polymer + anti-static agent. Such films also have excellent see-through properties which is advantageous for reading code numbers preprinted on a product wrapped with the film. More particularly, some very advantageous films have the structure: LLDPE + antistatic agent/adhesive/polyether block amide copolymer + aromatic sulfonamide antistatic agent/adhesive/EVA + antistatic agent. Embodiments of these are illustrated in the Examples below.

The term "polyethylene" as used herein, which "polyethylene" may be employed as a polyolefin in the outer layers of the preferred film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.936 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas, the older, classic high density types are usually polymerized at relatively low temperatures and pressures.

The term "linear low density polyethylene" (LLDPE) as used herein, for a type of polyethylene, refers to the newer copolymers of a major amount of ethylene with a minor amount of one or more comonomers selected from $C_4$ to $C_{10}$ alpha olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, and more preferably in the range of from about 0.912 g/cc to about 0.928 g/cc for film making purposes. The melt flow index of LLDPE generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. LLDPE is well known for its structural strength and anti-stress-cracking properties. Thus, it serves well in a wrap around material for packaging electronic components which typically have sharp projections. Also, LLDPE is known for its favored properties in the heat shrink process, and thus is well suited if it is desired to make a heat shrinkable film as discussed above. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein, for a type of polyolefin useful in the outer layers refers to a copolymer formed from ethylene and vinyl acetate (VA) monomers. The ethylene derived units in the copolymer are present in major amounts and the VA derived units in the copolymer are present in minor amounts. EVA is also known for having structural strength, as LLDPE does. For film making purposes, it is preferred that the VA content of the EVA be from about 3% to about 25%.

The term "polypropylene" (PP) as used herein for a type of polyolefin useful in the outer layers refers to polymers of propylene, and includes homopolymers, copolymers, such as for example block, graft, random, and alternating, copolymers, terpolymers etc. and blends and modifications thereof.

Blends of all families of polyolefins, such as blends of EVA, VLDPE, and LLDPE, may also be advantageously employed.

An "adhesive" is defined herein as the material which may be employed in the adhesive interlayers useful in the multilayer embodiment of the invention, which material may be any of the various adhesives well known in the art of multilayer film making. More particularly, the adhesive interlayers bonded to adjacent layers are composed generally of a polyolefin chemically modified by the provision of functional groups having a strong affinity fo the adjacent layer and which will form a strong bond under the heat and pressure of coextrusion. A suitable adhesive is one of the Plexar TM adhesives commercially available from the Chemplex Company of Rolling Meadows, Ill. Generally, Plexar adhesive is composed of an acid anhydride grafted polyolefin. Plexar adhesives are described in detail in U.S. Pat. Nos. 4,087,587 and 4,087,588. Plexar-2 adhesive may generally be characterized as an adhesive of the type comprising blends of a graft copolymer of a high density polyethylene and at least one unsaturated, fused ring, carboxylic acid anhydride, blended with one or more resin copolymers of ethylene and an ethylenically unsaturated ester. Plexar-3 comprises blends of a graft copolymer of an EVA and at least one unsaturated fused ring carboxylic acid anhydride, blended with a polyolefin resin of one or more homopolymers of ethylene, copolymers of ethylene and an alpha-olefin or any of all of these. Another suitable adhesive is Admer LF500 TM commercially available from the Mitsui Company which comprises a LDPE chemically modified with phthalic acid to an extent sufficient for the above stated function. A very suitable adhesive is XU 61515.02L, an acid modified octene based LLDPE supplied by Dow Chemical Company.

An "oriented" or "heat shrinkable" material is defined herein as a material which, when heated to an appropriate temperature above room temperature (for example 96° C.), will have a free shrink of 5% or greater in at least one linear direction.

As used herein the term "extrusion" or the term "extruding" is intended to include coextrusion, extrusion coating, or combinations thereof, whether by tubular methods, planar methods, or combinations thereof.

MATERIALS

A mixture of ortho and para toluenesulfonamide was supplied by Monsanto Company, St. Louis, Mo., under the name Santicizer TM 9, and currently is supplied by Akzo Chemie America, Chicago, Ill., under the name Ketjenflex TM 9. N-ethyl-ortho,para-toluenesulfonamide was supplied by Monsanto Company under the name Santicizer TM 8, and currently is supplied by Akzo Chemie America under the name Ketjenflex TM 8. It is a solid. N-butyl benzene sulfonamide is supplied by Unitex Chemical Corporation, Greensboro, N.C., under the name Uniplex TM 214. It is a liquid.

EVAL TM is EVOH (ethylene vinyl alcohol polymer) supplied by EVAL Corporation.

Surlyn 1652 and Surlyn 1705 are marketed by E. I. du Pont de Nemours and Company. Surlyn polymers are metal salt neutralized copolymers of an alpha-olefin having the formula $RHC=CH_2$ wherein R is H or $C_1$ to $C_8$ alkyl and an alpha,beta-ethylenically unsaturated carboxylic acid. These polymers are described in the disclosures of U.S. Pat. No. 3,355,319 issued November 28, 1967 to Rees and U.S. Pat. No. 3,845,163 issued Oct. 29, 1974 to Murch, both assigned to du Pont.

Plexar-3 TM is an adhesive marketed by Chemplex Company, Rolling Meadows, Ill. XU 61515.02L is an acid modified octene based adhesive LLDPE, supplied by Dow Chemical.

Dowlex TM 2045.03 is a LLDPE supplied by Dow Chemical Company, Midland, Michigan. It has a melt index of 1.1 and a density of 0.920, and the comonomer is octene. Escorene TM is Escorene LL 3001.63, a LLDPE supplied by Exxon. It has a melt index of 1.0 and a density of 0.918 and the comonomer is hexene.

Chemplex 3405 is a LDPE supplied by Chemplex Company, Rolling Meadows, Illinois. Density=0.922 and melt index=3.6.

EPE 8160 clear concentrate antiblock is a micron sized silica supplied by Teknor Apex.

Trycol TM 5984 is a polyethoxylated cetyl alcohol (PECA) supplied by Emery Industries.

Food grade glyceryl monostearate CPH-53-N is supplied by C. P. Hall.

Alathon F-3445 is an EVA having about 3.5% VA. Elvax 3130 is an EVA having about 12% VA. Both are supplied by Du Pont.

EVA PE 202 CS-287 (formerly PE 202 CS-284 and XO-757) is an EVA having about 3.3% VA supplied by EL Paso and its melt flow at condition E is 2.0±0.2.

EVA LD-318.92 is an EVA copolymer having about 9% VA. It has a melt index of 2.0. EVA 32.89 is an ethylene/vinyl acetate copolymer having about 4.5% VA and its melt index is about 10. Both are supplied by Exxon.

Grilamid TM L25W40 is a nylon 12 containing about 15% by weight N-butyl-benzene-sulfonamide and 15% by weight nylon 6/12. Grilamid TM L25N150 is a nylon 12 containing about 30% by weight N-butyl-benzene-sulfonamide and 15% by weight nylon 6/12. Both are supplied by Emser Werke AG, Zurich, Switzerland.

Commercially available PAEP copolymers are supplied by Atochem under the trade-name Pebax ®. Atochem's Pebax--33 series of resins have a density of about 1.01.

The following Examples illustrate the preferred embodiments of the invention. It is not intended to limit the invention thereby.

EXAMPLES

Percentages indicated in the Examples were calculated as percent by weight.

In the Examples below, additives were preblended into the polymer feed. In general additives used were solids and mixing was accomplished with a blender. However, Uniplex 214 brand of aromatic sulfonamide is a liquid, and thus the polymer feed simply soaked up the Uniplex 214.

The films were made by a conventional method of manufacturing, known as tubular extrusion, and colloquially called the hot blown bubble technique to achieve an essentially non-oriented (non-heat-shrinkable) film. A tubular process was utilized wherein a primary coextruded tube of the film was biaxially stretched with internal pressure in the transverse direction and with the use of pinch rolls at different speeds in the machine direction. Then the stretched bubble was cooled and collapsed, and the film wound up as flattened, seamless, tubular film to be used later to make bags, bubble cap, et cetera. When film is made by a tubular process, the tubular film is desirably fully coextruded, as full coextrusion is advantageous in that all layers of the multilayer film are directly melt jointed for enhanced interlayer strength. However where designated, some of the films were heat pressed film "plattens".

Also, in some embodiments the film structure was then guided through an ionizing radiation field; for example, through the beam of an electron accelerator to receive a radiation dosage in the range up to about 20 megarads (MR). It is known that irradiation enhances structural integrity, as measured by abuse resistance, tensile strength, and/or puncture resistance, et cetera, and in a multi-layer film irradiation provides enhanced delamination resistance. Moreover, as can be seen in Examples XIV and XV below, it has been unexpectedly discovered that the combination of irradiation and antistatic agents in certain polyether block amide copolymer films resulted in a highly preferred antistatic film, i.e. a film having a decay time of the highly preferred 2000 ms or less, whereas a similar but unirradiated polyether block amide copolymer film had a decay time well above the highly preferred 2000 ms or less.

In the examples below, the ability of film samples of about 3⅛×7½ inches (about 7.9×19 cm) to dissipate a static charge was measured on a static decay meter using the procedure described in Federal Test Method Standard 101C, Method 4046.1, "Electrostatic Properties of Materials" (change notice dated Oct. 8, 1982). Samples were subjected to various abusive conditions, such as a hot oven at 160° F. (71° C.) or a water shower, as indicated. It is mentioned that although Federal Test Method 101C states equilibration shall be for 24 hours, where noted, some samples were equilibrated at about room temperature at less than about 15% relative humidity (RH) for the time indicated rather than for 24 hours, after the abusive conditioning. For measuring decay time, each sample was placed in a static decay meter at room temperature, 72°–73° F., (22°–23° C.) and charged to ±5000 VDC (volts direct current) at less than about 15% RH, and the time for 99% of the charge to dissipate (decay to technical zero) was then measured, and is indicated in milliseconds (ms).

EXAMPLES OF FILMS OF POLYAMIDES (OTHER THAN PAEPC) CONTAINING SULFONAMIDES

Samples of nylon films containing aromatic sulfonamide are substantially reproduced here from copending U.S. Ser. No. 918,754, now U.S. Pat. No. 4,800,115, the above-mentioned parent of this Continuation-in-Part, as Examples I through X. Except where differences are indicated, samples were conditioned at about room temperature at less than about 15% RH for about 24 hours. After conditioning each was placed in a static decay meter at 72°–73° F. (22°–23° C.) and charged to ±5000 VDC at less than about 15% RH. The time for 99% of the charge to dissipate (decay to technical zero) was then measured.

EXAMPLE I

Blends were prepared of Grilamid L25W40 (samples A and B below) or Grilamid L25N150 (the remaining samples below) with various polymers such as EVAL TM, Surlyn TM, EVA LD-318.92, or Dowlex 2045.03 LLDPE on a weight percent basis of total blend by mixing in a blender. Each resultant was granulated and extruded into a monolayer film, having a thickness of about 2 mils (51 micrometers). Samples were cut and tested 4 times on each side thereof, wherein 2 of the 4 were at +5000 V and 2 were at −5000 V, for a total of 8 tests by applying ±5000 VDC and measuring the decay time as described by Federal Test Method 101C, Method 4046.1 except that none of the samples was subjected to preconditioning equilibration for 24 hours at room temperature at less than about 15% RH, but rather tested as is. The conditions inside the static decay meter during the testing were about 72°–73° F. (22°–23° C.) and about 13–15% RH. The average of the 8 tests for each sample is indicated in the Table below.

TABLE A

STATIC DECAY TIME (Average of 8 Tests)

| SAMPLE | Surlyn 1652 | Surlyn 1705 | EVAL | Nylon* | N—butyl* benzene Sulfonamide | EVA LD-318.92 | Dowlex 2045 LLDPE | AVERAGE TIME SECONDS (ms) |
|---|---|---|---|---|---|---|---|---|
| A | | | 90% | 8.5% | 1.5% | | | above 50 (above 50000) |
| B | | | 75% | 21.25% | 3.75% | | | above 50 (above 50000) |
| C | | | 50% | 42.5% | 7.5% | | | above 50 (above 50000) |
| D | | | | 70% | 30% | | | 0.36 (360) |
| E | | 50% | | 35% | 15% | | | 2.08 (2080) |
| F | 50% | | | 35% | 15% | | | 1.23 (1230) |
| G | | | | 35% | 15% | 50% | | 0.85 (850) |
| H | | | | 35% | 15% | | 50% | 0.15 (150) |

*Source of the nylon + sulfonamide for Samples A and B was Grilamid L25W40, and source of the nylon + sulfonamide for Samples, C, D, E, F, G and H was Grilamid L25N150.

As can be seen from Table A, a highly desirable static decay time of about 2 seconds or less was achieved with weight % amounts of N-butyl benzene sulfonamide down to about 15%. At 7.5% or less of the aromatic sulfonamide (samples A, B, and C), an unacceptable decay time greater than 50 seconds (greater than 50000 ms) was observed.

EXAMPLE II

Using the method of tubular coextrusion followed by hot blowing a bubble to make a non-oriented film as described above, a multi-ply film with an average thickness of 3.5 mils (about 88 micrometers) was made having the following structure:

| Layer | Material | Function |
|---|---|---|
| 1 | Grilamid L25N150 nylon | Antistatic |
| 2 | Plexar-3 | Adhesive |
| 3 | Dowlex 2045.03 LLDPE | Dielectric |
| 4 | Plexar-3 | Adhesive |
| 5 | Grilamid L25N150 nylon | Antistatic |

The film was cut into samples of about $3\frac{1}{8} \times 7\frac{1}{2}$ inches (about 7.9×19 cm), for running tests. Two tests were run for dielectric strength, which was found to be excellent. A high charge of 19KV did not pierce through the samples, but rather arced around them. Also, although as noted above there is not necessarily a correlation, 8 tests were run for surface resistivity and the average was found to be $2.5 \times 10^{11}$ ohms/square, well within the DOD and EIA antistatic range. Lastly, 8 tests were run for static decay, 4 for each side, wherein 2 of the 4 were at +5000 V and 2 were at −5000 V, using Federal Test Method 4046.1 described above. The average time for 99% of the initial charge of ±5000 V to decay was found to be 0.742 seconds (742 ms).

EXAMPLE III

A film was made as in Example II, except that the film was irradiated at 4 MR after coextrusion and hot blowing the bubble. The resultant was observed to be of improved structural integrity.

EXAMPLE IV

Using the method of tubular coextrusion followed by hot blowing a bubble to make a non-oriented film as described above, a multi-ply film with an average thickness of 2 mils (51 micrometers) was made having the following structure.

| Layer | Material | Function |
|---|---|---|
| 1 | Grilamid L25N150 nylon | Antistatic |
| 2 | Plexar-3 | Adhesive |
| 3 | Escorene LL3001.63 LLDPE | Dielectric |
| 4 | Escorene LL3301.63 LLDPE | Dielectric |
| 5 | Escorene LL3301.63 LLDPE | Dielectric |
| 6 | Escorene LL3001.63 LLDPE | Dielectric |
| 7 | EVA 32.89 | Dielectric |

The film was cut into samples of about $3\frac{1}{8} \times 7\frac{1}{2}$ inches (about 7.9×19 cm), for running tests. Two tests were run for dielectric strength, and the average was found to be 5.3 KV. Also, although as noted above there is not necessarily a correlation, 8 tests were run for surface resistivity and the average was found to be between $10^9$ and $10^{12}$ ohms/square, well within the DOD and EIA antistatic range.

Lastly, 8 tests were run for static decay, 4 for each side wherein 2 of the 4 were at +5000 V and 2 were at −5000 V, using Method 4046.1 described above. The average time for 99% of the initial charge of ±5000 V to decay was found to be 0.990 seconds (990 ms).

EXAMPLE V

A film was made as in Example IV, except that the film was irradiated at 9 MR after coextrusion and hot blowing the bubble. The resultant was observed to be of improved structural integrity.

EXAMPLE VI

A first roll of the unirradiated film of Example IV was longitudinally thermally laminated to a second roll of the unirradiated film of Example IV with the EVA side of each roll being in contact, the resultant having the multi-ply structure:

Grilamid/Plexar/Escorene/EVA/EVA/Escorene/-Plexar/Grilamid.

EXAMPLE VII

A first roll of the irradiated film of Example V was longitudinally laminated to a second roll of the irradiated film of Example V with the EVA side of each roll being in contact, the resultant having the multi-ply structure:

Grilamid/Plexar/Escorene/EVA/EVA/Escorene/-Plexar/Grilamid.

EXAMPLE VIII

Using a bubble cap machine such as those described in U.S. Pat. No. 4,576,669 and U.S. Pat. No. 4,579,516 both to Caputo, the film of Example IV was fed into the machine to make bubble cap. A first roll of the film was fed into the machine at about 240°-260° F. (about 115°-127° C.) to form ⅜ inch (0.95 cm) diameter bubbles while a second roll of the film was fed into the machine at about 350° F. (177° C.) to seal to the first roll (with the EVA side of each roll being in contact) thereby entrapping air in the bubbles, the resultant having the multi-ply structure:

Grilamid/Plexar/Escorene/EVA/EVA/Escorene/-Plexar/Grilamid.

Electronic circuit boards were wrapped with the resultant bubble cap film. The film was very tough and afforded excellent cushioning. Also, no corrosion of the wrapped board was observed during storage. Also, portable work stations such as those according to U.S. Pat. No. 4,494,651 were lined with resultant bubble cap.

EXAMPLE IX

Bubble cap was made as in Example VIII, but using the irradiated film of Example V instead of the unirradiated film of Example IV.

Electronic circuit boards were wrapped with the resultant bubble cap film. The film was very tough and afforded excellent cushioning. Also, no corrosion of the wrapped board was observed during storage. Also, portable work stations such as those according to U.S. Pat. No. 4,494,651 were lined with resultant bubble cap.

EXAMPLE X

Using the method as in Example II, a film is made having the structure: nylon 6/Grilamid L25N150/nylon 6 , and it exhibits a desirable static decay time of less than about 2000 milliseconds.

EXAMPLE XI (FILM OF GRILAMID NYLON CONTAINING AROMATIC SULFONAMIDE AS CORE, AND SKIN LAYERS OF POLYOLEFIN)

Tests were conducted on a 5-layer film having a core layer comprising Emser Grilamid L25N150 (a blend of nylon 12, nylon 6/12, and N-butyl benzene sulfonamide), one skin layer comprising EVA and the other skin layer comprising LLDPE. Using the method of tubular coextrusion with hot blowing a bubble to make a non-oriented film as described above, a 5-layer film (in both an unirradiated version and an irradiated version) of the following structure was made:

| FILM B: LAYER | INGREDIENTS |
| --- | --- |
| 1 | 98.5% Alathon F-3445 EVA<br>1% Trycol 5984 PECA<br>0.5% CPH-53-N Glyceryl Monostearate |
| 2 | Dow XU61515.02L Adhesive |
| 3 | Grilamid L25N150 nylon<br>(blend of nylon 12, nylon 6/12, and<br>N—butyl-benzene-sulfonamide) |

-continued

| FILM B: LAYER | INGREDIENTS |
| --- | --- |
| 4 | Dow XU61502.L Adhesive |
| 5 | 98.5% Escorene LL3001.63 LLDPE<br>1% Trycol 5984 PECA<br>0.5% CPH-53-N Glyceryl Monostearate |

If film samples were irradiated, the dosage in MR is indicated in Table B below. Film samples were subjected to various abuse conditions as indicated in the Table, and tested for decay time in accordance with Federal Test Method 101C, Method 4046.1. Only those samples so noted were subjected to the preconditioning equilibration for 24 hours at room temperature (RT) at less than 15% RH as per the Federal Test Method, or some different time of equilibration, such as 3 days as indicated in the Table.

TABLE B

| FILM SAMPLE AND IRRAD. (MR) | ABUSE CONDITIONING | DECAY TIME (ms) |
| --- | --- | --- |
| B1 (0) | Original - Prior To any abuse conditioning | 166 |
| B2 (4.5) | Original - Prior To any abuse conditioning | 90; 78; 64 (Average = 77) |
| B3 (4.5) | 71° C. humid oven with water beaker for 22 hours | Above 30000 |
| B4 (4.5) | Recheck of above sample after 3 day equilibration | Above 30000 |
| B5 (4.5) | 71° C. dry oven with water beaker for 22 hours | Above 20000 |
| B6 (4.5) | Recheck of above sample after 3 day equilibration | Above 30000 |

As can be seen, this film did not survive the abuse conditions, although before abuse, it had excellent decay times of 166 ms (Sample B1) and 77 ms AVERAGE (Sample B2).

EXAMPLES OF FILMS OF POLYETHER BLOCK AMIDE COPOLYMER (PAEPC)

EXAMPLE XII

Using a blender, N-butyl benzene sulfonamide (Uniplex 214) was mixed with various polyether block amide copolymers chosen from the Pebax--33 series of resins on a weight percent basis of total blend as indicated below. Each resultant was heat pressed into a monolayer film platten. Two samples of each film were tested on one side thereof, by applying +5000 VDC and measuring the original decay time in milliseconds (ms) as described by Federal Test Method 101C, Method 4046.1 discussed above, except that none of the samples was subjected to the Federal Test Method equilibration for 24 hours at room temperature at less than about 15% RH, but rather each was tested as is. Each of the two was then maintained for 16 hours in a 160° F. (71° C.) oven, one under a "humid" atmosphere by keeping a beaker of water in the oven and one under a "dry" atmosphere without any water beaker in the oven during the 16 hours, and the decay time test repeated. Also as a comparison, films made of 100% PAEP (without any aromatic sulfonamide additive) were tested for original static decay time. The conditions inside the static decay meter during the testing were about 72°-73° F. (22°-23° C.) and about 13-15% RH. No Samples were irradiated. Test results for each sample are indicated in Table C below.

TABLE C

| Film Sample | Ingredients | Original Decay Time (ms) Prior To Hot Oven Abuse | Decay Time (ms) After 71° C. Humid Oven With Water Beaker for 16 Hrs. | Decay Time (ms) After 71° C. Oven Without Water Beaker for 16 Hrs. |
|---|---|---|---|---|
| CI | 100% Pebax 2533 | 11860 | | |
| CIA1 | 90% Pebax 2533<br>10% Sulfonamide | 180 | | 176 |
| CIA2 | 90% Pebax 2533<br>10% Sulfonamide | 71 | 71 | |
| CIB1 | 80% Pebax 2533<br>20% Sulfonamide | 18 | | 17 |
| CIB2 | 80% Pebax 2533<br>20% Sulfonamide | 12 | 11 | |
| CIC1 | 70% Pebax 2533<br>30% Sulfonamide | 5 | | 5 |
| CIC2 | 70% Pebax 2533<br>30% Sulfonamide | 5 | 5 | |
| CII | 100% Pebax 3533 | 20990 | | |
| CIIA1 | 90% Pebax 3533<br>30% Sulfonamide | 210 | | 221 |
| CIIA2 | 90% Pebax 3533<br>10% Sulfonamide | 227 | 211 | |
| CIIB1 | 80% Pebax 3533<br>20% Sulfonamide | 22 | | 21 |
| CIIB2 | 80% Pebax 3533<br>20% Sulfonamide | 16 | 16 | |
| CIIC1 | 70% Pebax 3533<br>30% Sulfonamide | 6 | | 6 |
| CIIC2 | 70% Pebax 3533<br>30% Sulfonamide | 7 | 6 | |
| CIII | 100% Pebax 4033 | 5575 | | |
| CIIIA1 | 90% Pebax 4033<br>10% Sulfonamide | 163 | | 161 |
| CIIIA2 | 90% Pebax 4033<br>10% Sulfonamide | 228 | 239 | |
| CIIIB1 | 80% Pebax 4033<br>20% Sulfonamide | 31 | | 34 |
| CIIIB2 | 80% Pebax 4033<br>20% Sulfonamide | 36 | 28 | |
| CIIIC1 | 70% Pebax 4033<br>30% Sulfonamide | 8 | | 9 |
| CIIIC2 | 70% Pebax 4033<br>30% Sulfonamide | 11 | 13 | |
| CIV | 100% Pebax 5533 | 3342 | | |
| CIVA1 | 90% Pebax 5533<br>10% Sulfonamide | 148 | | 124 |
| CIVA2 | 90% Pebax 5533<br>10% Sulfonamide | 139 | 143 | |
| CIVB1 | 80% Pebax 5533<br>20% Sulfonamide | 73 | | 98 |
| CIVB2 | 80% Pebax 5533<br>20% Sulfonamide | 59 | 74 | |
| CV | 100% Pebax 6333 | 13868 | | |
| CVA1 | 90% Pebax 6333<br>10% Sulfonamide | 1191 | | 1089 |
| CVA2 | 90% Pebax 6333<br>10% Sulfonamide | 1020 | 1070 | |

As can be seen from Table C, the film samples consisting of 100% PAEP had high decay times of more than about 3.3 seconds (Sample CIV) up to about 14 seconds (Sample CV). No PAEP film by itself dissipated ±5000 VDC in less than 3000 ms let alone in less than the preferred 2000 ms, and thus such a film would be inappropriate as a wrap for sensitive electronic components. Thus, these PAEP monolayer films behaved more as insulators, not as antistatic plastic, which is typical for polymers, although as mentioned above, it is known from the Atochem advertising brochure that the various Pebax--33 resins have a surface resistivity of $10^{10}$. However, as also can be seen from Table C, for each Pebax--33 in blend with aromatic sulfonamide, the decay times were well under the desirable 2000 ms or less. Moreover, for each particular Pebax--33 in blend with aromatic sulfonamide, whether the sample was heated in the hot "dry" oven or hot "humid" oven or tested without hot oven abuse, the decay times were substantially similar. For instance, looking at Samples CIII A1 and A2 (the blend of 90% Pebax 4033 with 10% aromatic sulfonamide), the decay times ranged from 161 ms to 239 ms. Thus heat and humidity for 16 hours had little or no impact on the desirable 2000 ms or less decay time antistatic properties of plastic films made of a particular Pebax--33 blended with aromatic sulfonamide.

EXAMPLE XIII

Blends were prepared of Pebax 4033 with various aromatic sulfonamides and made into monolayer film plattens as described in Example XII. As in Example XII, a sample of each was tested for original decay time without any 24 hour equilibration. None of these samples had been irradiated. The results are summarized in Table D below.

TABLE D

| Film Sample | Ingredients | Original Decay Time (ms) |
|---|---|---|
| 1 | 100% Pebax 4033 | 5575 |
| 2 | 90% Pebax 4033<br>10% N,N—dibutyl-para-toluene sulfonamide | 556 |
| 3 | 90% Pebax 4033<br>10% N—butyl-para-toluene sulfonamide | 306 |
| 4 | 90% Pebax 4033<br>10% para-toluene sulfonamide | 246 |
| 5 | 100 grams Pebax 4033<br>16.5 grams N,N—dibutyl-para-toluene sulfonamide | 405 |
| 6 | 100 grams Pebax 4033<br>14.4 grams N—phenyl-para-toluene sulfonamide | 438 |
| 7 | 100 grams Pebax 4033<br>13.27 grams para-toluene sulfonamide | 84 |
| 8 | 100 grams Pebax 4033<br>10 grams N—butyl-para-toluene sulfonamide | 373 |

As can be seen from Table D, various other aromatic sulfonamides were effective with Pebax besides the N-butyl-benzene sulfonamide illustrated in Table C. Also, the more blocked the amide nitrogen of the sulfonamide group was (sample 2), the longer the decay time (556 ms) was as compared to the decay time (246 ms) of a sulfonamide where the amide nitrogen was unblocked (sample 4).

EXAMPLE XIV

Using the methods of tubular coextrusion with hot blowing a bubble to make a non-oriented film as described above, a 5-layer film (in both an unirradiated version and an irradiated version) of the following structure was made:

| FILM E:<br>LAYER | INGREDIENTS |
|---|---|
| 1 | (96.5% Alathon F-3445 EVA<br>95% (1% Trycol 5984 PECA)<br>(2.5% CPH-53-N Glyceryl Monosterate)<br>5% EPE 8160 Antiblock |
| 2 | Dow XU61515.02L Adhesive |
| 3 | 90% Pebax 2533<br>10% Uniplex 214 N—butyl-benzene-sulfonamide |
| 4 | Dow XU61515.02L Adhesive |
| 5 | (96.5% Escorene LL3001.63 LLDPE)<br>95% (1% Trycol 5984 PECA)<br>(2.5% CPH-53-N Glyceryl Monosterate)<br>5% EPE 8160 Antiblock |

Except for E1 which was not irradiated, the film samples were irradiated at a dosage of about 6 to 6.5 MR. Film samples were subjected to various abuse conditions as indicated in the Table, and tested for decay time in accordance with Federal Test Method 101C, Method 4046.1. Only those samples so noted were subjected to the preconditioning equilibration for 24 hours at RT at less than 15% RH as per the Federal Test Method, or some lesser time such as 1 hour or 18 hours, as indicated in the Table.

TABLE E

| FILM SAMPLE | CONDITION | DECAY TIME (ms) |
|---|---|---|
| E1 | Original - Prior to any abuse conditioning | 4000 |
| E2 | Original - Prior to any abuse conditioning | 135; 144; 104; 134; 148; 150; (Average = 136) |
| E3 | Original - Prior to any abuse conditioning but after 24 hours equilibration | 153 |
| E4 | 71° C. humid oven with water beaker for 24 hours, followed by sitting in room for 1 hour | 437 |
| E5 | 71° C. humid oven with water beaker for 24 hours, followed by sitting in room for 1 hour, followed by 18 hour equilibration | 446 |
| E6 | 71° C. dry oven without water beaker for 24 hours, followed by sitting in room for 1 hour | 203 |
| E7 | 71° C. dry oven without water beaker for 24 hours, followed by sitting in room for 1 hour, followed by 18 hour equilibration | 220 |
| E8 | 71° C. dry oven without water beaker for 48 hours, followed by 1 hour equilibration | 409 |
| E9 | 71° C. dry oven without water beaker for 72 hours, followed by 1 hour equilibration | 547 |
| E10 | 71° C. dry oven without water beaker for 96 hours, followed by 1 hour equilibration | 604 |
| E11 | 71° C. dry oven without water beaker for 120 hours, followed by 1 hour equilibration | 695 |
| E12 | 71° C. dry oven without water beaker for 144 hours, followed by 1 hour equilibration | 676 |
| E13 | 71° C. dry oven without water beaker for 168 hours, followed by 1 hour equilibration | 646 |
| E14 | 71° C. dry oven without water beaker for 240 hours, followed by 1 hour equilibration | 840 |
| E15 | 71° C. dry oven without water beaker for 288 hours, followed by 1 hour equilibration | 1021 |
| E16 | 1 hour water shower, followed by sitting in room for 1 hour | 91 |
| E17 | 1 hour water shower, followed by sitting in room for 1 hour, followed by 18 hour equilibration | 139 |
| E18 | 3 hour water shower, followed by sitting in room for 1 hour | 75 |
| E19 | 3 hour water shower, followed by sitting in room for 1 hour, followed by 18 hour equilibration | 113 |
| E20 | 24 hour water shower, followed by sitting in room for 1 hour, followed by 1 hour equilibration | 97 |
| E21 | 24 hour water shower, followed by sitting in room for 1 hour, followed by 24 hour equilibration | 126 |

It is noted from Table E, that prior to abuse conditioning, the film when not irradiated (Sample E1), did not have a decay time of less than 3000 ms (decay time=4000 ms), but when irradiated (Samples E2 and E3) displayed excellent highly preferred decay times under 2000 ms (from 104 to 153 ms). Moreover, it is noted that after all abuse conditioning (i.e. a hot humid oven for 24 hours, a hot dry oven for times from 24 hours to 288 hours, a water shower for times from 1 hour to 24 hours), the film samples had excellent highly preferred decay times ranging from 1021 ms (sample E15) to 91 ms (sample E16). As comparison, it is noted from sample e in Table N below that the particular 3-layer LLDPE film (which did not contain a core layer of polyether block amide copolymer+aromatic sulfonamide) did not survive the 24 hour water shower.

EXAMPLE XV

Tests were conducted on variations of 5-layer films (films F through J) having a core layer comprising PAEPC, one skin layer comprising EVA and the other skin layer comprising LLDPE. Using the method of tubular coextrusion with hot blowing bubble to make a non-oriented film as described above, 5-layer films (in both an unirradiated version and an irradiated version) of the following structures F–J were made:

| Film F: LAYER | INGREDIENTS |
|---|---|
| 1 | 98.5% Alathon F-3445 EVA<br>1% Trycol 5984 PECA<br>0.5% CPH-53-N Glyceryl Monostearate |
| 2 | Dow XU61515.02L Adhesive |
| 3 | 90% Pebax 4033<br>10% Uniplex 214<br>N—butyl-benzene-sulfonamide |
| 4 | Dow XU61502.L Adhesive |
| 5 | 98.5% Escorene LL3001.63 LLDPE<br>1% Trycol 5984 PECA<br>0.5% CPH-53-N Glyceryl Monostearate |

If film samples were irradiated, the dosage in MR is indicated in Table F below. Film samples were subjected to various abuse conditions as indicated in Table F and tested for decay time in accordance with Federal Test Method 101C, Method 4046.1. Only those samples so noted were subjected to the preconditioning equilibration for 24 hours at room temperature (RT) at less than 15% RH as per the Federal Test Method, or some different time of equilibration, such as 3 days.

TABLE F

| FILM SAMPLE AND IRRAD (MR) | ABUSE CONDITIONING | DECAY TIME (ms) |
|---|---|---|
| F1<br>(0) | Original - Prior<br>To any abuse conditioning | 5031 |
| F2<br>(4.5) | Original - Prior<br>To any abuse conditioning | 339; 332; 289<br>(Average = 320) |
| F3<br>(4.5) | 71° C. humid oven with water beaker for 22 hours | 10700 |
| F4<br>(4.5) | Recheck of above sample after 3 day equilibration | 11000 |
| F5<br>(4.5) | 71° C. dry oven without water beaker for 22 hours | 3185 |
| F6<br>(4.5) | Recheck of above sample after 3 day equilibration | 2992 |

| FILM G: LAYER | INGREDIENTS |
|---|---|
| 1 | (98.5% Alathon F-3445 EVA)<br>95% (1% Trycol 5984 PECA)<br>(0.5% CPH-53-N Glyceryl Monostearate)<br>5% EPE 8160 Antiblock |
| 2 | Dow XU61515.02L Adhesive |
| 3 | 90% Pebax 4033<br>10% Uniplex 214 N—butyl-benzene-sulfonamide |
| 4 | Dow XU61515.02L Adhesive |
| 5 | (98.5% Escorene LL3001.63 LLDPE)<br>95% (1% Trycol 5984 PECA)<br>(0.5% CPH-53-N—Glyceryl Monostearate)<br>5% EPE 8160 Antiblock |

If the film samples were irradiated, the dosage in MR is indicated in Table G below. Film samples were subjected to various abuse conditions as indicated in Table G, and tested for decay time as per Federal Test Method 101C, Method 4046.1. No samples were subjected to the preconditioning equilibration for 24 hours at RT at less than 15% RH as per 101C.

TABLE G

| FILM SAMPLE AND IRRAD. (MR) | ABUSE CONDITIONING | DECAY TIME (ms) |
|---|---|---|
| G1<br>(0) | Original - Prior to any abuse conditioning | 16045 |
| G2<br>(4.5) | Original - Prior To any abuse conditioning | 354; 3370; 363<br>(average = 362) |
| G3<br>(4.5) | 71° C. humid oven with water beaker for 18 hours | 3437 |
| G4<br>(4.5) | 71° C. dry oven without water beaker for 18 hours | 1278 |

| FILM H: LAYER | INGREDIENTS |
|---|---|
| 1 | (98.5% Alathon F-3455 EVA)<br>95% (1% Trycol 5984 PECA)<br>(0.5% CPH-53-N Glyceryl Monostearate)<br>5% EPE 8160 Antiblock |
| 2 | Dow XU61515.02L Adhesive |
| 3 | Pebax 4033 |
| 4 | Dow XU61515.02L Adhesive |
| 5 | (98.5% Escorene LL3001.63 LLDPE)<br>95% (1% Trycol 5984 PECA)<br>(0.5% CPH-53-N Glyceryl Monostearate)<br>5% EPE 8160 Antiblock |

If film samples were irradiated, the dosage in MR is indicated in Table H below. Film samples were subjected to various abuse conditions as indicated in Table H, and tested for decay time as per Federal Test Method 101C, Method 4046.1. No samples were subjected to the preconditioning equilibration for 24 hours at RT at less than 15% RH as per 101C.

TABLE H

| FILM SAMPLE AND IRRAD. (MR) | ABUSE CONDITIONING | DECAY TIME (ms) |
|---|---|---|
| F1<br>(0) | Original - Prior to any abuse conditioning | Sample behaved as insulator* |
| F2<br>(4.5) | Original - Prior to any abuse conditioning | Sample behaved as insulator |
| F3<br>(4.5) | 71° C. humid oven with water beaker for 18 hours | Sample behaved as insulator |
| F4<br>(4.5) | 71° C. dry oven without water beaker for 18 hours | Sample behaved as insulator |

| FILM I: LAYER | INGREDIENTS |
|---|---|
| 1 | 95% Alathon F-3445 EVA<br>5% EPE 8160 Antiblock |
| 2 | Dow XU61515.02L Adhesive |
| 3 | Pebax 4033 |
| 4 | Dow XU61515.02L Adhesive |
| 5 | 95% Escorene LL3001.63 LLDPE<br>5% EPE 8160 Antiblock |

*Time was over 20 seconds.

If film samples were irradiated, the dosage in MR is indicated in Table I below. Film samples were subjected to various abuse conditions as indicated in Table H, and tested for decay time as per Federal Test Method 101C, Method 4046.1. No samples were subjected to the preconditioning equilibration for 24 hours at RT at less than 15% RH as per 101C.

TABLE I

| FILM SAMPLE AND IRRAD. (MR) | ABUSE CONDITIONING | DECAY TIME (ms) |
|---|---|---|
| G1 (0) | Original - Prior To any abuse conditioning | Sample behaved as insulator* |
| G2 (4.5) | Original - Prior To any abuse conditioning | Sample behaved as insulator |
| G3 (4.5) | 71° C. humid oven with water beaker for 18 hours | Sample behaved as insulator |
| G4 (4.5) | 71° C. dry oven without water beaker for 18 hours | Sample behaved as insulator |

| FILM J: LAYER | INGREDIENTS |
|---|---|
| 1 | 95% Alathon F-3455 EVA 5% EPE 8160 Antiblock |
| 2 | Dow XU6151.02L Adhesive |
| 3 | 90% Pebax 4033 10% Uniplex 214 N—butyl-benzene-sulfonamide |
| 4 | Dow XU61515.02L Adhesive |
| 5 | 95% Escorene LL3001.63 LLDPE 5% EPE 8160 Antiblock |

*Time was over 20 seconds.

If film samples were irradiated, the dosage in MR is indicated in Table J below. Film samples were subjected to various abuse conditions as indicated in the Table, and tested for decay time as per Federal Test Method 101C, Method 4046.1. No samples were subjected to the preconditioning equilibration for 24 hours at RT at less than 15% RH as per 101C.

TABLE J

| FILM SAMPLE AND IRRAD. (MR) | ABUSE CONDITIONING | DECAY TIME (ms) |
|---|---|---|
| J1 (0) | Original - Prior To any abuse conditioning | 39500 |
| J2 (4.5) | Original - Prior to any abuse conditioning | 1061; 1027; 1216 (Average = 1101) |
| J3 (4.5) | 71° C. humid oven with water beaker for 18 hours | 6150 |
| H4 (4.5) | 71° C. dry oven without water beaker for 18 hours | 27000 |

It is noted from Films F and G of Example XV, that only when irradiated, did these 5-layer films exhibit the highly preferred antistatic film decay time of 2000 ms or less, despite the fact they contained the antistatic agents of the invention, namely aromatic sulfonamide in the polyether block amide copolymer core layer, and PECA and glyceryl monostearate in the polyolefin outer layers.

Furthermore, it is noted from Film H of Example XV, the 5-layer film wherein the polyether block amide copolymer core layer did not contain any aromatic sulfonamide yet the EVA and LLDPE skin layers did contain antistatic agents of PECA and glyceryl monostearate, that Film H always behaved as an insulator; it did not behave as an antistatic film even when irradiated at 4.5 MR. While it is not intended to be bound to any theory, it is believed that this behavior of Film H is due to the thick core layer (see Table C above wherein it is shown that Pebax by itself without any aromatic sulfonamide did not have a decay time under 2000 ms) diluting the effect of the EVA and LLDPE antistatic outer layers. Monolayer film of LLDPE containing PECA and glyceryl monostearate, and monolayer film of EVA containing PECA and glyceryl monostearate did indeed behave as antistatic films; see Examples XVI and XIX, respectively, below.

EXAMPLES OF POLYOLEFIN FILMS (NO NYLON; NO POLYETHER BLOCK AMIDE COPOLYMER) CONTAINING PECA AND/OR GLYCERYL MONOSTEARATE

To establish similarities and dissimilarities with Example XV Film H above, samples of monolayer or 3-layer films wherein all layers comprised polyolefin (EVA, LDPE, or LLDPE) containing PECA and/or gylceryl monostearte (but no layer comprised nylon or polyether block amide copolymer) were made. It can be seen that whether irradiated or not, these films did have the highly preferred antistatic films decay time of 2000 ms or less.

EXAMPLE XVI

Using the method of tubular coextrusion followed by hot blowing a bubble to make a non-oriented film as described above, a single layer film was made having the following composition: Escorene LL 3001.63 LLDPE with 1% by weight Trycol 5984 polyethoxylated cetyl alcohol and 0.5% by weight glyceryl monostearate CPH-53-N, hereinafter designated as CF1. A sample was cut, and after equilibrating the sample for 1 hour (instead of 24 hours) at 72° F. (22° C.) at less than 15% RH, the static decay time tested as per Federal Test Method 101C was found to be 130 ms. The sample was tested again 4 days later, and the static decay time was found to be 77 ms.

EXAMPLE XVII

A single layer film was made as in Example XVI, but comprising CF1+5% weight EPE 8160 antiblock.

EXAMPLE XVIII

Four additional samples (a, b, c, and d) of CF1 of Example XVI, were equilibrated for 1 hour (instead of 24 hours) at 72° F. (22° C.) at less than 15% RH. Then they were tested for static decay. Then, each of the 4 samples was subjected to a different treatment (some of which were abusive, such as a 160° F. oven or a vacuum jar) for 88 hours, as indicated in Table K below, and again equilibrated for 1 hour at 72° F. (22° C.) at less than 15% RH, and checked again for static decay.

TABLE K

| Sample | 88 Hour Treatment | Static Decay Time Berore Treatment (ms) | Static Decay Time After 88 Hour Treatment (ms) |
|---|---|---|---|
| a | 72° F. (22° C.) 15% RH | 370 | 101 |
| b | 160° F. Oven (71° C. Oven) in which a beaker of water was kept to maintain a humid atmosphere | 67 | 141 |
| c | 160° F. Oven (71° C. Oven) without the beaker of water | 188 | 51 |
| d | Vacuum jar maintained at a pressure under 20 Torr at 73° F. (23° C.) | 312 | 87 |

As can be seen from the Table, even after abusive treatments of heat, humidity an vacuum, the film samples still had excellent static decay times well within the highly desired 2000 ms or less range.

EXAMPLE XIX

Single layer films CF2, CF3, and CF4, were made as in Example XVI, except that instead of the polyethylene Escorene LL 3001.63, the following polyolefins were used: CF2 was Alathon F-3445 EVA with 1% by weight Trycol 5984 polyethoxylated cetyl alcohol and 0.5% by weight glyceryl monostearate CPH-53-N; CF3 was Elvax 3130 EVA with 1% by weight Trycol 5984 and 0.5% by weight glyceryl monostearate CPH-53-N; and CF4 was Chemplex 3405 LDPE with 1% by weight Trycol 5984 and 0.5% by weight glyceryl monostearate. Samples were equilibrated at 72° F. (22° C.) for 1 hour (instead of 24 hours) at less than 15% RH and then checked for static decay. The results are summarized in Table L below.

TABLE L

| Sample | Static Decay Time (ms) |
| --- | --- |
| CF2 | 552 |
| CF3 | 173 |
| CF4 | 58 |

EXAMPLE XX

To illustrate the effect of a lesser static time by employing a combination of both Trycol 5984 polyethoxylated cetyl alcohol and glyceryl monostearate, as described above in Example XVI, two single layer films were made as in Example XVI, but one of them, CF1(a), was made without glycerol monostearate, and the other CF1(b) was made without Trycol 5984 polyethoxylated cetyl alcohol. CF1(a) was Escorene LL 3001.63 LLDPE with 1% by weight Trycol 5984. CF1(b) was Escorene LL 3001.63 LLDPE with 0.5% by weight glyceryl monostearate. Samples were equilibrated at 72° F. (22° C.) for 1 hour (instead of 24 hours) at less than 15% RH and then checked for static decay. The results are summarized in Table M below.

TABLE M

| Sample | Static Decay Time (ms) |
| --- | --- |
| CF1(a) | 1203 |
| CF1(b) | 485 |

As can be seen the static decay time of 77 ms of Example XVI was much less than the static decay times reported in Table M.

EXAMPLE XXI

Using the method of tubular coextrusion followed by hot blowing a bubble to make a non-oriented film as described above, a multi-ply film was made having the following structure wherein CF1 was Escorene LL 3001.63 LLDPE with 1% by weight Trycol 5984 and 0.5% by weight glyceryl monostearate CPH-53-N.:

| Layer | Material |
| --- | --- |
| 1 | CF1 + 5% by weight EPE 8160 |
| 2 | CF1 |
| 3 | CF1 + 5% by weight EPE 8160 |

A sample was left to sit at ambient conditions for about 88 hours and then equilibrated for 1 hour (instead of 24 hours) at 72° F. (22° C.) at less than 15% RH, and the static decay time tested. The time to decay was found to be 101 milliseconds.

EXAMPLE XXII

A 3-layer film was made as in Example XXI, except that the film was irradiated at about 4.3 MR after coextrusion and hot blowing the bubble. The resultant was observed to be of improved structural integrity. A sample was left to sit at ambient conditions for about 88 hours and then equilibrated for 1 hour (instead of 24 hours) at 72° F. (22° C.) at less than 15% RH and the static decay time was found to be 53 milliseconds.

For running abusive tests, samples were equilibrated for 1 hour (instead of 24 hours) at 72° F. (22° C.) at less than 15% RH. Then, they were tested for surface resistivity and static decay. Then, each sample was subjected to a different abusive treatment for 88 hours, (such as a 160° F. oven abuse, a vacuum jar abuse, or a 24 hour water shower abuse) as indicated in Table N below, and again equilibrated for 1 hour at 72° F. (22° C.) at less than 15% RH, and checked again for surface resistivity and static decay.

TABLE N

| | | Before 88 Hour Treatment | | After 88 Hour Treatment | |
| --- | --- | --- | --- | --- | --- |
| Sample | (88 Hours) Abusive Treatment | Surface Resistivity (ohms/square) | Static Decay (ms) | Surface Resistivity (ohms/square) | Static Decay (ms) |
| a | 72° F. (22° C.) | $1 \times 10^{10}$ | 39 | $2 \times 10^{10}$ | 44 |
| b | 160° F. Oven (71° C. Oven) in which a beaker of water was kept to maintain as humid atmosphere | $6 \times 10^{10}$ | 46 | $9 \times 10^{10}$ | 154 |
| c | 160° F. Oven (71° C. Oven) without the beaker of water | $6 \times 10^{10}$ | 39 | $9 \times 10^{10}$ | 144 |
| d | Vacuum jar maintained at a pressure under 20 Torr at 73° F. (23° C.) | $5 \times 10^{10}$ | 52 | $4 \times 10^{10}$ | 115 |

TABLE N-continued

| | | Before 88 Hour Treatment | | After 88 Hour Treatment | |
|---|---|---|---|---|---|
| Sample | (88 Hours) Abusive Treatment | Surface Resistivity (ohms/square) | Static Decay (ms) | Surface Resistivity (ohms/square) | Static Decay (ms) |
| e | 24 hour water shower after which sample was blotted dry with a towel | $7 \times 10^{10}$ | 49 | $1 \times 10^{14}$ | Over 20000 ms (Over 20 Seconds) |

As can be seen from the Table, surface resistivity either before or after each abusive treatment was still in the desirable DOD and EIA antistatic range of about $10^9$ to $10^{14}$, and likewise either before or after each abusive treatment (except for the 24 hour water shower), the static decay time was less than the highly desirable 2000 ms or less.

EXAMPLE XXIII

Another set of samples of the unirradiated film of Example XXI were subjected to the different 88 hour treatment abuses as in Example XVIII above, and then after equilibration for 1 hour (instead of 24 hours) at 72° F. (22° C.) at less than 15% RH, checked for static decay. The results are summarized in Table O below.

TABLE O

| Abusive Treatment | Static Decay Time (Milliseconds) |
|---|---|
| 160° F. Oven (71° C. Oven) in which a beaker of water was kept to maintain a humid atmosphere | 141 |
| 160° F. Oven (71° C. Oven) without the beaker of water | 51 |
| Vacuum jar maintained at a pressure under 20 Torr at 73° F. (23° C.) | 87 |

As can be seen from the Table, even after abusive treatments of heat, humidity and vacuum, the film samples still had excellent static decay times well less than the highly desired 2000 milliseconds or less.

EXAMPLE XXIV

Samples of the irradiated film of Example XXII were subjected to the different 88 hour treatment abuses as in Example XVIII above, and then after equilibration for 1 hour (instead of 24 hours) at 72° F. (22° C.) at less than 15% RH, checked for static decay. The results are summarized in Table P below.

TABLE P

| Abusive Treatment | Static Decay Time (Milliseconds) |
|---|---|
| 160° F. Oven (71° C. Oven) in which a beaker of water was kept to maintain a humid atmosphere | 370 |
| 160° F. Oven (71° C. Oven) without the beaker of water | 218 |
| Vacuum jar maintained at a pressure under 20 Torr at 73° F. (23° C.) | 262 |

As can be seen from the Table, even after abusive treatments of heat, humidity and vacuum, the film samples still had excellent static decay times well under the highly desired 2000 milliseconds or less.

EXAMPLE XXV

A single layer film was made as in Example XVI, but comprising 75% CF1+20% Escorene LL 3001.63 LLDPE+5% EPE 8160 antiblock by weight. Samples were cut and tested 2 times on each side thereof, wherein 1 of the 2 was at +5000 VDC and the other was at −5000 VDC, for a total of 4 tests by applying ±5000 VDC and measuring the decay time as described by Federal Test Method 101C, Method 4046.1. None was subjected to preconditioning equilibration, but tested as is. Conditions inside the decay meter were about 22°–23° C. and about 13–15% RH. All but one sample was subjected to abusive treatment for 64 hours of a 160° F. (71° C.) oven in which a beaker of water was kept to maintain a humid atmosphere. The results are summarized in Table Q below.

TABLE Q

| | Side #1 | | Side #2 | | Average |
|---|---|---|---|---|---|
| 64 Hour Abusive Treatment | +5000 VDC Decay Time (ms) | −5000 VDC Decay Time (ms) | +5000 VDC Decay Time (ms) | −5000 VDC Decay Time (ms) | Decay Time of 4 Tests (ms) |
| No | 152 | 147 | 172 | 176 | 162 |
| Yes | 460 | 455 | 476 | 464 | 464 |
| Yes | 580 | 588 | 607 | 588 | 591 |

While certain representative embodiments and details have been shown for the purpose of illustration, numerous modifications to the formulations described above can be made without departing from the invention disclosed.

We claim:

1. An antistatic film comprising at least one layer comprising a blend of a polyether block amide copolymer having a degree of hydrophilicity suitable for packaging electronic devices in admixture with an aromatic sulfonamide antistatic agent, wherein said aromatic sulfonamide is substantially non-hygroscopic and substantially non-migratable.

2. The film of claim 1, wherein the antistatic agent is present in the blend in an amount from about 5% to about 80% by weight.

3. The film of claim 1, wherein the aromatic sulfonamide is benzenesulfonamide, N-butyl benzenesulfonamide, o-toluenesulfonamide, p-toluenesulfonamide, N-ethyl-o-toluene sulfonamide, N-ethyl-p-toluenesulfonamide, or mixtures thereof.

4. The film of claim 1, wherein the polyether block amide copolymer has nylon 12 as its polyamide component and polytetramethylene oxide as its polyether component.

5. The film of claim 1, further including at least one layer of polyolefin.

6. The film of claim 5, wherein said polyolefin is in admixture with an antistatic agent chosen from fatty acid esters of polyhydroxy alcohols, polyalkoxylated compounds or mixtures thereof.

7. The film of claim 6, wherein the polyalkoxylated compound is selected from the polyethylene oxides, polypropylene oxides, polybutylene oxides, polytetramethylene oxides, the reaction products of polyalkoxylates with fatty acids, the reaction products of polyalkoxylates with fatty alcohols, the reaction products of polyalkoxylates with fatty acids esters of polyhydroxyl alcohols or mixtures thereof.

8. The film of claim 6, wherein the polyalkoxylated compound is a fatty compound, and wherein in the fatty acid ester of polyhydroxy alcohol, the polyalkoxylated compound, or mixtures thereof, each fatty group chain comprises a carbon chain from about $C_8$ and above.

9. The film of claim 8, wherein the antistatic agent in the polyolefin layer is polyethylene oxide, polyethoxylated cetyl alcohol, glycerol monostearate, or mixtures thereof.

10. The film of claim 6, wherein the polyolefin is LDPE, MDPE, HDPE, LLDPE, VLDPE, EVA, PP or mixtures thereof.

11. The film of claim 1, wherein said film has been irradiated at a dosage up to about 20 MR.

12. The film of claim 1, wherein said film is oriented.

13. As a composition of matter adapted for use to produce thermoplastic polymeric film having antistatic characteristics, a polyether block amide copolymer blend comprising a polyether block amide copolymer in admixture with an aromatic sulfonamide antistatic agent, wherein said aromatic sulfonamide is substantially non-hygroscopic and substantially non-migratable.

14. The blend of claim 13, wherein the antistatic agent is present in the blend in an amount from about 5% to about 80% by weight.

15. The blend of claim 13, wherein the aromatic sulfonamide is benzenesulfonamide, N-butyl benzenesulfonamide, o-toluenesulfonamide, p-toluenesulfonamide, N-ethyl-o-toluene sulfonamide, N-ethyl-p-toluenesulfonamide, or mixtures thereof.

16. The blend of claim 13, wherein the polyether block amide copolymer has nylon 12 as its polyamide component and polytetramethylene oxide as its polyether component.

17. A method for protecting packaged static sensitive devices from electrostatic charges comprising:
(a) providing a package comprising an antistatic film having at least one layer comprising a blend of a polyether block amide copolymer in admixture with an aromatic sulfonamide antistatic agent, wherein said aromatic sulfonamide is substantially non-hygroscopic and substantially non-migratable; and
(b) enclosing said film about a selected device.

18. The method of claim 17, wherein said polyether block amide copolymer has nylon 12 as its polyamide component and polytetramethylene oxide as its polyether component, and further including at least one layer of polyolefin.

19. The method of claim 18, wherein said film comprises at least the multilayer structure: polyolefin/polyether block amide copolymer+aromatic sulfonamide antistatic agent/polyether block amide copolymer+aromatic sulfonamide antistatic agent/polyolefin in air cushion form.

20. The method of claim 17, wherein said film has been irradiated at a dosage up to about 20 MR.

21. The method of claim 17, wherein said film is oriented.

22. A film having anti-static properties comprising at least the structure polyolefin/polyether block amide copolymer+aromatic sulfonamide antistatic agent/polyether block amide copolymer+aromatic sulfonamide antistatic agent/polyolefin, in air cushion form.

23. An antistatic film comprising a layer of a major amount by weight of a polyether block amide copolymer having nylon 12 as its polyamide component and polytetramethylene oxide as its polyether component, and a minor amount by weight of aromatic sulfonamide.

24. The film of claim 23, which will, after being subjected to a hot humid oven abuse for up to about 24 hours, exhibit a decay time of about 2000 ms or less.

25. The film of claim 23, which will, after being subjected to a hot dry oven abuse for up to about 288 hours, exhibit a decay time of about 2000 ms or less.

26. The film of claim 23, which will, after being subjected to a water shower abuse for up to about 24 hours, exhibit a decay time of about 2000 ms or less.

27. The film of claim 23, which will, only after being irradiated up to a dosage of about 20 MR, exhibit a decay time of about 2000 ms or less.

28. The film of claim 23, further including at least one outer layer of a major amount by weight of a polyolefin and a minor amount by weight of fatty acid esters of a polyhydroxy alcohol, polyalkoxylated compounds or mixtures thereof, which film will exhibit a decay time of about 2000 ms or less.

* * * * *

UNITED STATES PATENT AND TRADEMARK OFFICE
CERTIFICATE OF CORRECTION

PATENT NO. : 4,899,521

DATED : February 13, 1990

INVENTOR(S) : Marvin R. Havens

It is certified that error appears in the above-identified patent and that said Letters Patent is hereby corrected as shown below:

On the front page of the patent insert an "*" before the patent date.

After item [73], insert -[*] Notice The portion of the term of this patent subsequent to November 28, 2006, has been disclaimed-.

Signed and Sealed this

Twentieth Day of August, 1991

Attest:

HARRY F. MANBECK, JR.

*Attesting Officer*

*Commissioner of Patents and Trademarks*